United States Patent
Kornegay et al.

(10) Patent No.: US 7,844,779 B2
(45) Date of Patent: Nov. 30, 2010

(54) METHOD AND SYSTEM FOR INTELLIGENT AND DYNAMIC CACHE REPLACEMENT MANAGEMENT BASED ON EFFICIENT USE OF CACHE FOR INDIVIDUAL PROCESSOR CORE

(75) Inventors: Marcus L. Kornegay, Durham, NC (US); Ngan N. Pham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 11/955,670

(22) Filed: Dec. 13, 2007

(65) Prior Publication Data

US 2009/0157970 A1    Jun. 18, 2009

(51) Int. Cl.
*G06F 13/00* (2006.01)
(52) U.S. Cl. .............................. 711/133; 711/E12.069; 711/134; 711/135; 711/136
(58) Field of Classification Search .......... 711/133–136
See application file for complete search history.

(56) References Cited

U.S. PATENT DOCUMENTS

| | | | |
|---|---|---|---|
| 6,681,297 B2 | 1/2004 | Chauvel et al. | |
| 6,978,349 B1 | 12/2005 | Wilkes | |
| 7,039,760 B2 | 5/2006 | Arimilli et al. | |
| 2002/0073282 A1* | 6/2002 | Chauvel et al. | 711/122 |
| 2004/0098541 A1* | 5/2004 | Megiddo et al. | 711/129 |
| 2005/0071564 A1* | 3/2005 | Luick | 711/121 |
| 2006/0053257 A1 | 3/2006 | Sistla et al. | |
| 2006/0143390 A1 | 6/2006 | Kottapalli | |
| 2006/0179196 A1 | 8/2006 | Gray | |
| 2006/0218352 A1 | 9/2006 | Shannon et al. | |
| 2007/0079072 A1 | 4/2007 | Collier et al. | |
| 2008/0086600 A1* | 4/2008 | Qiao | 711/133 |
| 2009/0193196 A1* | 7/2009 | Kornegay et al. | 711/136 |
| 2009/0300631 A1* | 12/2009 | Karlapalem et al. | 718/103 |

OTHER PUBLICATIONS

A Dynamically Reconfigurable Cache for Multithreaded Processors, Settle et al., pp. 1-35.

Cooperative Caching for Chip Multiprocessors, Chang et al., Proceedings of the 33rd International Symposium on Computer Architecture (ISCA'06), 2006 IEEE.

(Continued)

*Primary Examiner*—Mardochee Chery
*Assistant Examiner*—Sean Rossiter
(74) *Attorney, Agent, or Firm*—Cantor Colburn LLP; Cynthia Seal

(57) ABSTRACT

Determining and applying a cache replacement policy for a computer application running in a computer processing system is accomplished by receiving a processor core data request, adding bits on each cache line of a plurality of cache lines to identify a core ID of an at least one processor core that provides each cache line in a shared cache, allocating a tag table for each processor core, where the tag table keeps track of an index of processor core miss rates, and setting a threshold to define a level of cache usefulness, depending on whether or not the index of processor core miss rates exceeds the threshold. Checking the threshold and when the threshold is not exceeded, then a shared cache standard policy for cache replacement is applied. When the threshold is exceeded, then the cache line from the processor core running the application is evicted from the shared cache.

1 Claim, 2 Drawing Sheets

OTHER PUBLICATIONS

Thread-Shared Software Code Caches, Bruening eet al., Proceedings of the International Symposium on Code Generation and Optimization (CGO'06), 2006 IEEE.

Modeling Cache Sharing on Chip Multiprocessor Architectures, [online]; [retrieved on Jun. 23, 2007]; retrieved from the Internet http://216.239.51.104/search?q=cache:gu-P-tfuXoAJ:www.cs.wisc.edu/-... multiprocessor+architectures&hL=en&ct=clnk&cd=1&gl=us&client=safari.

* cited by examiner

METHOD AND SYSTEM FOR INTELLIGENT AND DYNAMIC CACHE REPLACEMENT MANAGEMENT BASED ON EFFICIENT USE OF CACHE FOR INDIVIDUAL PROCESSOR CORE

TECHNICAL FIELD

The present invention relates to computer data processing systems and processor design. More particularly, the present invention relates to cache replacement management.

BACKGROUND

Known methods and systems for cache replacement management such as least-recently-used (LRU) policy is based on the concept that the least recently used cache line in a congruence class is the least important cache line to be retained. Therefore, this least important cache line would be the least recently accessed cache line set. With the advent of multi-core processors, processor applications can be simultaneously run on a single processor socket. Furthermore, in shared cache architecture applications, all processor cores in the same processor socket will share a common cache. The behavior of the applications running on each processor core can be very different from one another. It is possible that a certain application running on one core is cache friendly, while another application running on another core is not cache friendly. Thus, the non cache friendly application may not be able to take advantage of a "no reuse" policy of the data that is loaded in the cache, where the data can include audio and video streaming applications. Therefore, the LRU method for cache replacement management is not the best way to manage cache replacement, because the LRU method treats cache lines loaded by all cores equally, as a result of treating all cores equally, the LRU method allocates cache resources equally, including processor cores that do not benefit from the use of this cache resource, because performance in the these cores is not increased and furthermore, cache lines in the other cores that can make use of the LRU cache method are replaced prematurely, resulting in diminished available caches resources.

There are no known cache replacement management methods and systems that provide a high level of granularity to optimize cache management, improve the efficiency of the shared cache, and improve overall system performance, by dynamically providing more cache resources to cores whose applications can make good use of cache resources, while providing less cache resources to cores whose applications cannot benefit from the additional cache resources.

SUMMARY OF THE INVENTION

A method and system are disclosed herein for determining and applying a cache replacement policy for a computer processing system running a computer processing application. The method implemented on the computer processing system includes operations of receiving a processor core data request from the computer application, to check the status of cache misses and hits. Additional bits of data are added onto each cache line of a plurality of cache lines to identify a core ID of an at least one processor core of a plurality of processor cores that provides each cache line in a shared cache, when the computer application requests data from the at least one processor core. A tag table is allocating for each processor core. The tag table functions as a tag cache for the at least one processor core, and the tag table for that processor core is independent from other tag tables for other processor cores in a given shared processor socket, and where an address tag is stored in the tag table. A replacement operation used for the tag table equals a replacement operation used for the shared cache. The tag table keeps track of an index of processor core miss rates and the index contains cache misses per cache reference for each processor core, where the index of processor core miss rates indicates how cache friendly the computer application is. A threshold is set to define a level of cache usefulness for each processor core. The tag table is then checked to determine whether either the index of processor core miss rates exceeds the threshold or whether the index of processor core miss rates does not exceed the threshold. When the index of processor core miss rates exceeds the threshold, then there is not enough cache line reuse available for the computer application and cache use for the computer application is evicted first. In the alternate, when the index of processor core miss rates does not exceed the threshold, then a standard shared cache replacement policy is applied. The method then can return to any stage in the operations and either update the index or reset the threshold or receive another data request and continue the replacement management operations or the system can stop when the application is finished running.

The above-described and other features will be appreciated and understood by those skilled in the art from the following detailed description, drawings, and appended claims.

DETAILED DESCRIPTION OF THE DRAWINGS

The subject matter that, is regarded as the invention is particularly pointed out and distinctly claimed in the claims at the conclusion of the specification. The foregoing and other objects, features, and advantages of the invention are apparent from the following detailed description taken in conjunction with the accompanying drawings, which are meant to be exemplary, and not limiting, wherein;

DETAILED DESCRIPTION

The exemplary embodiment of the invention is described below in detail. The disclosed exemplary embodiment is intended to be illustrative only, since numerous modifications and variations therein will be apparent to those of ordinary skill in the art. In reference to the drawings, like numbers will indicate like parts continuously throughout the view. Further, the terms "a", "an", "first", "second" and "third" herein do not denote a limitation of quantity, but rather denote the presence of one or more of the referenced item.

Figure 1:
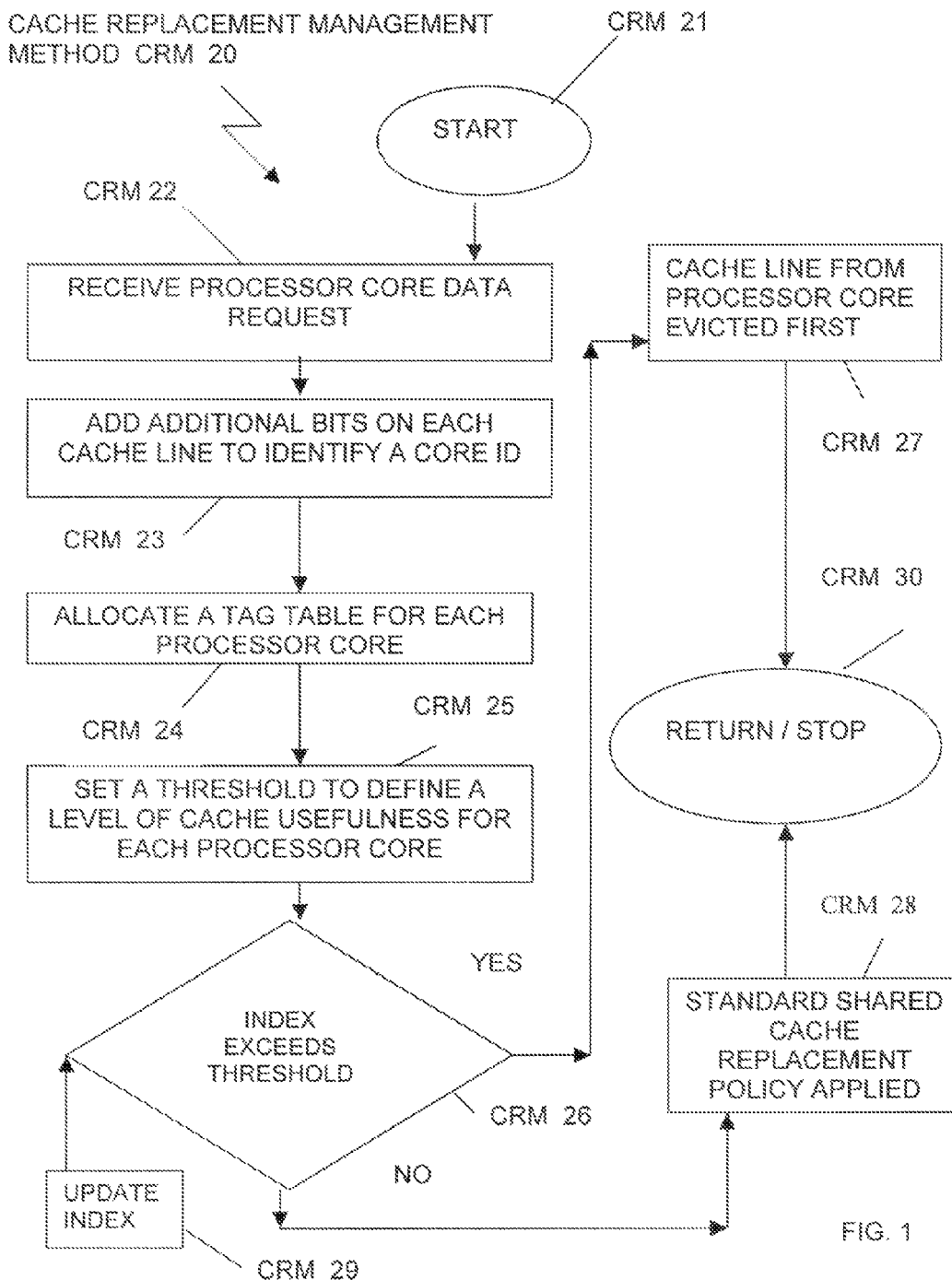
FIG. 1 illustrates a method of determining and applying a cache replacement policy for a computer application.
Figure 2:
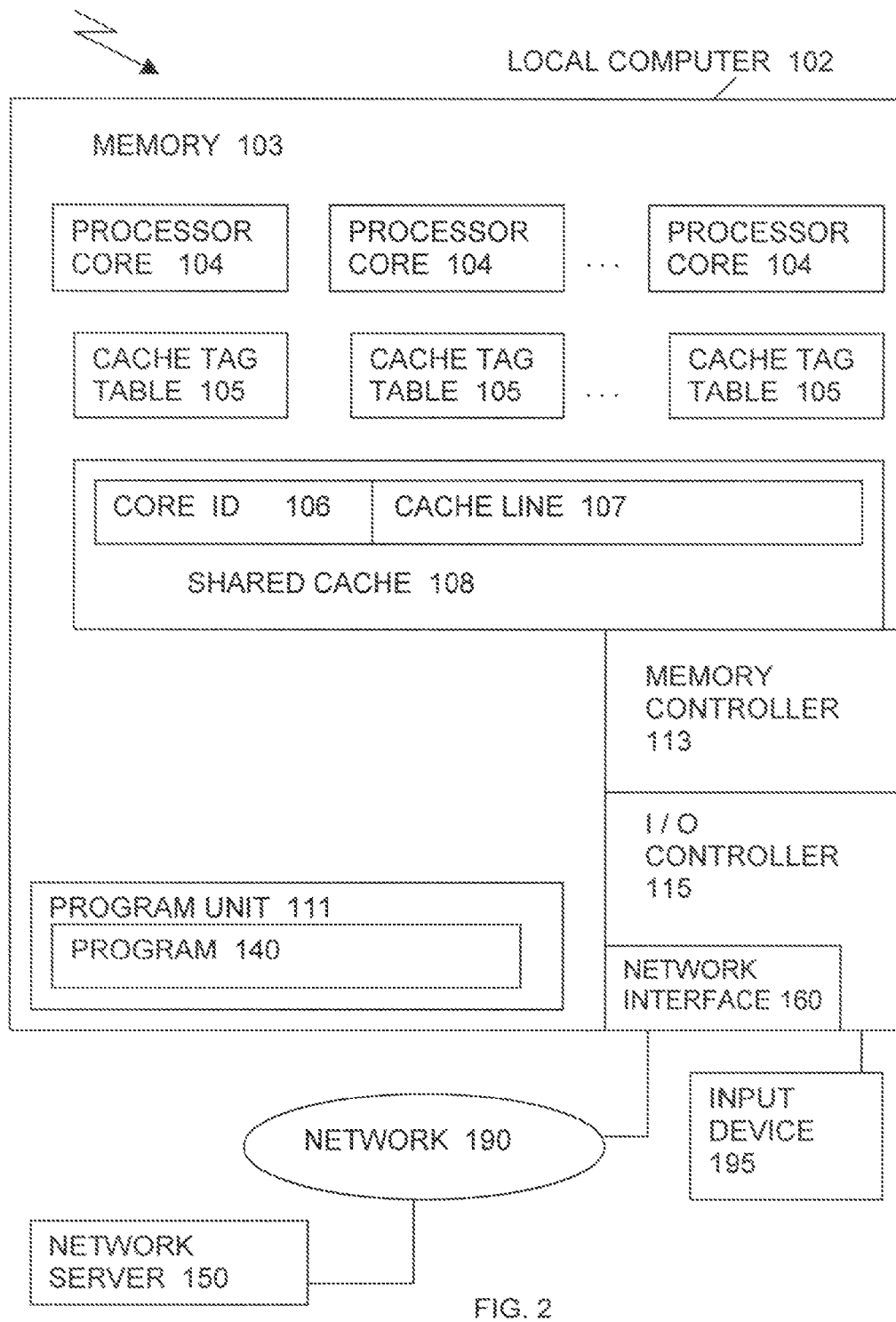
FIG. 2 illustrates the system implementation of the exemplary embodiment of determining and applying a cache replacement policy for a computer application, illustrated in FIG. 1.

The exemplary embodiment will be understood by referring to FIGS. 1 and 2. A cache replacement management method CRM 20 is illustrated in FIG. 1. Further, the cache replacement management method CRM 20 (hereafter CRM 20) is implemented in the cache replacement management system 100, illustrated in FIG. 2.

Referring to FIG. 2, the cache replacement management system 100 (hereafter system 100) includes local computer 102 connected to network server 150 over network 190. Network 190 can be a wired and/or wireless local area network or a wide area network, including an extranet or the Internet. Local computer 102 includes at least an input device 195, a network interface 160 and an assortment of internal and external controllers and/or peripheral devices including memory controller 113, and input/output (I/O) controller 115. The local computer 102 may have other components, which are omitted for simplicity, such as a display device. The network interface 160 can be, for example but not limited to, one or more buses or other wired or wireless connections, as is known in the art. The network interface 160 may have additional elements, which are omitted for simplicity, such as controllers, buffers (caches), drivers, repeaters, and receivers, to enable communications. Further, the network interface 160 may include address, control, and/or data connections to enable appropriate communications among the aforementioned components.

Input device 195 can include a mouse, a keyboard, a touch screen, a light pen, an optical detector, an audio sensor including a voice activation system, and a microphone. Local computer 102 also includes memory 103. Residing in memory 103 is program unit 111, which contains program 140. Program 140 can include any computer executable program code or algorithm or application software that can be stored on a computer executable medium, including memory 103 and can be compiled and run on a general purpose computer processor, or stand along computing system such as local computer 102, so as to cause local computer 102 to perform certain operations. Also, residing in memory 103 are a plurality of processor cores 104, a plurality of cache tag tables 105, a shared cache 108 in which resides core ID 106 and cache line 107.

The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge or cassette). Moreover, the memory 103 may incorporate electronic, magnetic, optical, and/or other types of storage media. Note that the memory 103 can have a distributed architecture, where various components are situated remotely from one another, but can be accessed by the local computer 102.

Referring to FIGS. 1 and 2, the exemplary embodiment of the cache replacement management method CRM 20 illustrated in FIG. 1 will be described as implemented in system 100, which is illustrated in FIG. 2. At operation start CRM 21, computer executable code in program 140, when executed by local computer 102, causes local computer 102 to perform the operation start CRM 21, to initiate the local computer 102 to run any given software applications.

At operation CRM 22, program 140, when executed by local computer 102, causes local computer 102 to receive a processor core data request, from a computer software application, to check the status of cache misses and hits.

At operation CRM 23, program 140, causes local computer 102 to add additional bits on each cache line 107 of a plurality of cache lines to identify a core ID 106 of an at least one processor core 104 of a plurality of processor cores that provides each cache line 107 in a shared cache 108, when the computer application requests data from the at least one processor core 104.

At operation CRM 24, program 140, causes local computer 102 to allocate a tag table 105 for each processor core 104, where the tag table 105 functions as a tag cache for the at least one processor core 104, and the tag table 105 for the at least one processor core 104 is independent from other tag tables 105 for other processor cores 104 in a shared processor socket, and where an address tag is stored in the tag table 105. A replacement operation used for the tag table 105 equals a replacement operation used for the shared cache 108. The tag table 105 keeps track of an index of processor core miss rates, and the index contains cache misses per cache reference for each processor core 104, and the index of processor core miss rates indicates how cache friendly the computer application is.

At operation CRM 25, program 140, causes local computer 102 to set a threshold to define a level of cache usefulness for each processor core 104.

At operation CRM 26, program 140, causes local computer 102 to check the tag table to determine whether the index of processor core miss rates exceeds the threshold or whether the index of processor core miss rates does not exceed the threshold. When the index of processor core miss rates exceeds the threshold, then there is not enough cache line reuse available for die computer application, and cache use for the computer application is evicted first, as illustrated in FIG. 1 at operation CRM 27. When the index of processor core miss rates does not exceed the threshold, then a standard shared cache replacement policy is applied, in regard to the computer software application running on the local computer 102, as illustrated, in FIG. 1 at operation CRM 28.

The method CRM 20 can return to any stage its the operations and either update the index or reset the threshold or receive another data request and continue the replacement management operations upon proceeding to operation return/stop CRM 30 or the system can stop when the application is finished running.

The disclosure has been described with reference to the exemplary embodiment, where the useful, practical and concrete result of cache replacement management with improved efficiency of the shared cache, and improved overall system performance is accomplished inventive design to dynamically providing more cache resources to cores whose applications can make good use of cache resources, while providing less cache resources to cores whose applications cannot benefit from the additional cache resources.

The capabilities of the present invention can be implemented in software, firmware, hardware or some combination thereof.

The local computer 102 is a hardware device for executing software, particularly that stored in memory 103. The local computer 102 can contain any custom made or commercially available processor, a central processing unit (CPU), an auxiliary processor among several processors associated with the local computer 102, a semiconductor based microprocessor (in the form of a microchip or chip set), a macroprocessor, or generally any device for executing software instructions.

The program 140, residing in memory 103 may include one or more separate programs, each of which comprises an ordered listing of executable instructions for implementing logical functions. In the example of FIG. 2, the program 140 in the memory 103 includes the method CRM 20 in accordance with the present invention and a suitable operating system (O/S), including Windows based operating systems.

Additionally, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

In the context of this document, a "computer-executable and/or readable medium" can be any medium that can store, communicate, propagate, or transport the program for use by or in connection with the instruction execution system, apparatus, or device. The computer readable medium can be, for example hut not limited to, an electronic, magnetic, optical, electromagnetic, infrared, or semiconductor system, apparatus, device, or propagation medium, upon which the program is printed, as the program can be electronically captured, via for instance optical scanning of paper or other medium, then compiled, interpreted or otherwise processed in a suitable manner if necessary, and then stored in a computer memory.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

In addition, many modifications may be made to adapt a particular situation or material to the teachings of the disclosure without departing from the essential scope thereof. For example, the method of continuously updating and checking the index of processor core miss rates threshold can be carried out by at least polling and/or interrupt operations. It will be understood by those skilled in the art that various changes may be made and equivalents may be substituted for elements thereof without departing from the scope of the disclosure. Therefore, it is intended that the disclosure not be limited to any one particular embodiment disclosed as the best mode contemplated for carrying out this disclosure, but that the disclosure will include all embodiments failing within the scope of the appended claims.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

In addition, many modifications may be made to adapt a particular situation or material to the teachings of the disclosure without departing from the essential scope thereof. It will be understood by those skilled in the art that various changes may be made and equivalents may be substituted for elements thereof without departing from the scope of the disclosure. Therefore, it is intended that the disclosure not be limited to any one particular embodiment disclosed as the best mode contemplated for carrying out this disclosure, but that the disclosure will include all embodiments falling within the scope of the appended claims.

What is claimed is:

1. A method, implemented in a computer processing system having a plurality of cache lines running a computer application, of cache replacement management, wherein the computer processing system contains a computer processor including a computer readable storage medium containing computer executable code that when executed by a local computer causes the local computer to perform the method comprising:

while determining whether to cease cache replacement management, performing operations including:

receiving a processor core data request to check the status of cache misses and hits, from the computer application;

adding additional bits on each cache line of the plurality of cache lines to identify a core ID of an at least one processor core of a plurality of processor cores that provides each cache line in a shared cache, when the computer application requests data from the at least one processor core;

allocating a tag table for each processor core, wherein the tag table functions as a tag cache for the at least one processor core, wherein the tag table for the at least one processor core is independent from other tag tables for other processor cores in a shared processor socket, wherein an address tag is stored in the tag table, wherein a replacement operation used for the tag table equals a replacement operation used for the shared cache, wherein the tag table keeps track of an index of processor core miss rates, wherein the index contains cache misses per cache reference for each processor core, and wherein the index of processor core miss rates indicates how cache friendly the computer application is;

setting a threshold to define a level of cache usefulness for each processor core;

checking the tag table to determine one of whether the index of processor core miss rates exceeds the threshold and whether the index of processor core miss rates does not exceed the threshold, wherein when the index of processor core miss rates exceeds the threshold, then there is not enough cache line reuse available for the computer application and cache use for the computer application is evicted first, and wherein when the index of processor core miss rates does not exceed the threshold, then a standard shared cache replacement policy is applied; and in response to a determination to return to one or more of the operations, the method includes at least one of updating the index, resetting the threshold, and receiving another data request.

* * * * *